Oct. 2, 1934.  G. CHRISTENSON  1,975,713
BRAKE SHOE ASSEMBLY
Filed May 4, 1932
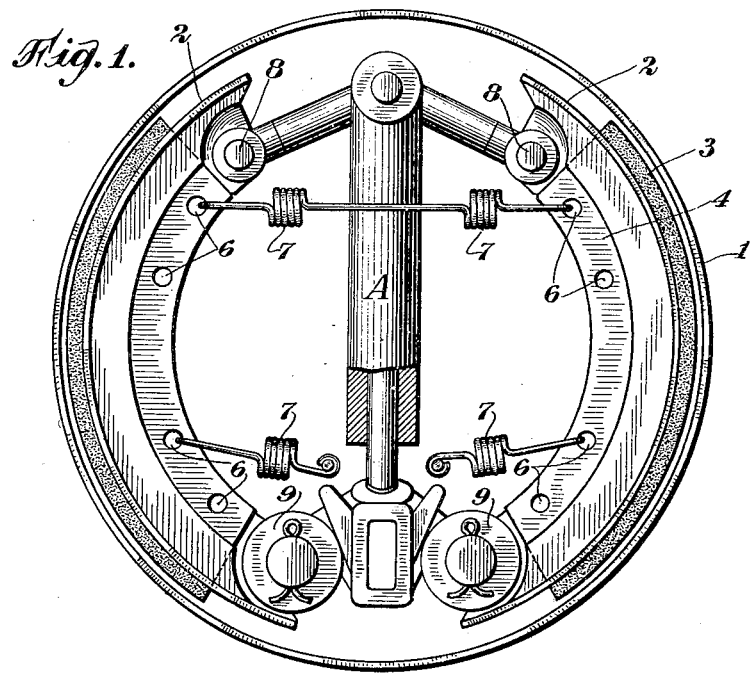
Fig. 1.
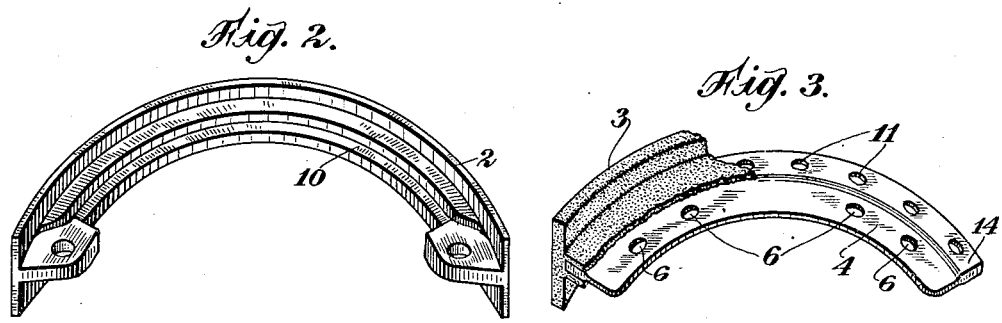
Fig. 2.
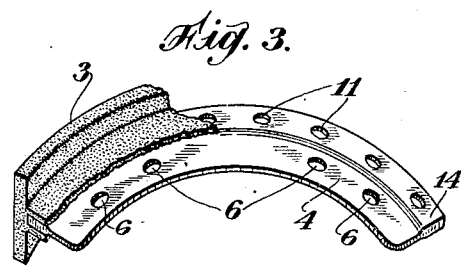
Fig. 3.
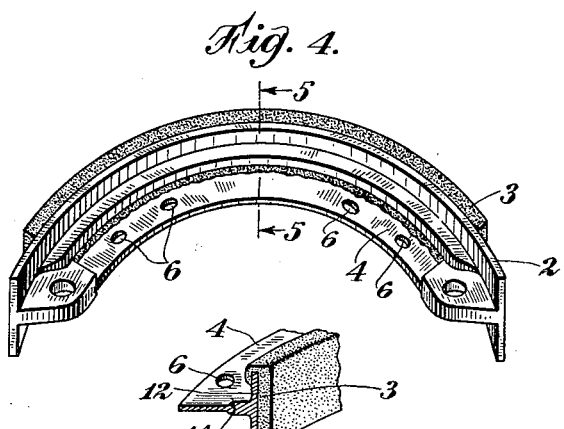
Fig. 4.
Fig. 5.
Fig. 6.
INVENTOR
George Christenson.
BY D. N. Halstead
ATTORNEY Patented Oct. 2, 1934

1,975,713

UNITED STATES PATENT OFFICE 1,975,713

BRAKE SHOE ASSEMBLY

George Christenson, Plainfield, N. J., assignor to Johns-Manville Corporation, New York, N. Y., a corporation of New York Application May 4, 1932, Serial No. 609,158

8 Claims. (Cl. 188—242)

This invention relates to a brake shoe assembly and especially to an assembly with a readily demountable braking element. It pertains more particularly to a braking assembly adapted to use on automobiles and comprising a band of friction material united to a supporting web member and a brake shoe with rim provided with a slot for receiving the supporting web member.

An object of the invention is to provide a friction element in which the band of friction material will have a substantially true arc shape. Another object is to provide a friction element which may be readily removed from a brake shoe or replaced by a new element. A further object is to provide a brake lining or band of friction material which may be free from rivets or other metal within the band, and thus to make available a greater thickness of the brake band for use as friction material. Additional objects and advantages will be evident from the following description.

It will be understood that a present practice of installing brake lining on brake shoes comprises the insertion of rivets through a part of the brake lining. These rivets tend to disturb the true arc shape desired for the band of brake lining, to produce unevenness of surface with depressions for the accumulation of dirt or other undesirable material, or to decrease the thickness of brake lining which may be worn away before metal comes in contact with the brake drum on which the friction material operates.

My invention will be illustrated by reference to the drawing.

Fig. 1 is an internal front view of a brake assembly with portions broken away for clearness of illustration, with the brake in rest or release position.

Fig. 2 is a perspective view of a brake shoe with a slot in the rim.

Fig. 3 is a perspective view of the friction element, comprising a band of friction material and a stiffening web member.

Fig. 4 is a perspective view showing the friction element assembled with the shoe, with the stiffening web member of the former in place in the slot of the latter.

Fig. 5 is a cross section on line 5—5 of Fig. 4.

Fig. 6 is a perspective sectional view of a modified form of brake shoe assembly.

In the various figures, like reference numbers refer to like parts.

The brake assembly illustrated in Fig. 1 is a type suitable for use in an automobile. 1 is a brake drum, 2 a slotted brake shoe, 3 an arcuate band of flexible, somewhat yieldable friction material integrally united to the edge portion only of the arcuate stiffening web member 4, which member is inserted through a slot in the rim of the brake shoe 2. The web member 4 is provided with holes 6 for engaging the springs 7 which hold the web member and the united brake band in firm contact with the brake shoe and also serve to release the brakes from contact with the brake drum when the actuating mechanism, indicated generally at A, is in the rest position. The brake shoes are attached at the lower ends to the rollers 9 and at the upper ends, by the pins 8, to the brake actuating mechanism.

Fig. 2 shows in more detail the brake shoe 2 with rim provided with slot 10 adapted to receive the web member 4.

Fig. 3 shows in detail the braking element with a portion of the friction material broken away for clearness of illustration. In this figure it will be seen that the cross section is T-shaped and that the web support member has two series of holes, the first, indicated by the numeral 11, serving as perforations through which the friction resistive material may be squeezed, for increasing the security of the anchorage, during the process of molding and uniting this material to the web member. The other series of holes 6 are those which are used for the engagement of the springs 7. It is shown also that the friction resistive material is united with the arcuate supporting web member along its edge portion.

Fig. 4 shows the assembly of the braking element with the brake shoe, the slot in the latter engaging the stiffening web of the former, ready for attachment to the rollers 9 and, by means of the pins 8, to the brake actuating mechanism A shown in Fig. 1.

Fig. 5 shows a transverse section of the braking element and brake shoe, and particularly the manner in which the friction material penetrates the holes 11 in the web support member 4 and is sustained in the assembly by the stiffening web 4 and also by the rim of the brake shoe 2.

Fig. 6 shows a modification of the braking element in which the supporting or stiffening member is T-shaped in cross section with a flange portion 12 integrally united to the band of friction material 3 and a web member 13 adapted to be engaged in the slot of a slotted brake shoe. The various parts of the element are suitably arcuate.

The web member may have flat faces or a thick edge forming a shoulder 14 engaged tightly in the slot in the rim of the brake shoe.

When it is desired to remove or replace the friction element in the assembly illustrated in Fig. 1, the spring 7 is disengaged and the web member is then removed from the slot, after which a new element may be introduced.

The friction composition may be integrally united to the supporting web member, as by hardening in situ. For friction compositions comprising a substantial proportion of rubber, this hardening may take the form of vulcanization, as, for example, by heating for one hour at approximately 350° F. The shaping of the friction material in contact with the web member is suitably made in a mold at an elevated pressure, such as 1200 pounds per square inch. The mold may have a shape adapted to form the arcuate band of friction material in contact with the arcuate web member placed edgewise and inwardly with respect to the band of friction material, as illustrated in the figures. For some purposes it is desirable that the portion of the friction material in contact with the edge portion of the supporting web member should be somewhat tapered, to facilitate the ready insertion of the element within the slot in the rim of the brake shoe and to prevent rattling of the assembly during use.

The composition used for friction material may be a suitable composition now used in forming automotive brake lining material. For example, there may be used to advantage asbestos fibres intermingled with a rubber composition commonly used in brake lining. The rubber composition may comprise rubber mixed with fillers, vulcanization accelerators, and/or other ingredients the use of which in this connection is known to those skilled in the art.

Variations from the illustrative details given above may be made without departing from the scope of the invention. Thus the holes 11 in the arcuate supporting web members may be omitted and the friction resistive material integrally united to an imperforate edge portion of the supporting or stiffening member.

The web member may suitably be of metal, as for example, steel or brass, but, under some circumstances, may be of the same composition as the band of friction material. In cases where the friction material is quite hard and strong or where the pull of the springs 7 is not very great, the web member may be of the same composition as the band of friction material. Thus certain compositions of phenol-aldehyde resins and asbestos fibre may be used sometimes without a metal web member. However, friction material of more usual composition with a firm metal web member support constitutes a preferred embodiment of this invention.

There may be used, according to the invention, a braking element, suitably arcuate, comprising a band of friction material, united to two web members, one near each edge of the band, the said web members extending inwardly, in a combination with a doubly slotted brake shoe adapted to receive the two web members. This construction with double web member supports is not recommended for relatively small braking units, such as those of automobiles.

For such units, an assembly that is particularly satisfactory is that illustrated in Figs. 1 to 5, in which there is a single web member attached to the friction material and the latter is self-sustaining, except for the stiffening web member and the additional support afforded in the brake shoe assembly by the slotted rim of the brake shoe.

What I claim is:

1. A braking element of T-shaped transverse section comprising an arcuate web member and an arcuate band of self-sustaining rubber-containing friction material united to said web by vulcanization in situ, the web member extending in an edgewise manner inwardly from said band.

2. A brake with a readily demountable braking element comprising in combination a band of flexible, somewhat yieldable, friction material, a stiffening member integrally united to said friction material and including a web member, and a slotted brake shoe engaging the web member.

3. A brake with a readily demountable braking element comprising an arcuate band of flexible, somewhat yieldable, friction material, a stiffening member integrally united to said friction material and including a web member, and a slotted brake shoe engaging the web member.

4. A brake comprising in combination an arcuate somewhat yieldable band of friction material, a stiffening web member integrally united at its edge portion to said friction material, and a brake shoe with a rim provided with a slot engaging the web member, said band of friction material being self-sustaining except for the support afforded by the web member and the rim of the brake shoe.

5. An automotive brake comprising in combination an arcuate band of friction material, a rigid web member placed edgewise and inwardly with respect to the band of friction material and integrally united at the edge portion thereto, a brake shoe with a rim provided with a slot engaging the web member, and means attached to said web member and holding the friction material in contact with the brake shoe.

6. A brake assembly adapted to permit easy removal of the braking element comprising a stiffening metal web member, a band of friction material united to an edge portion of the web member by hardening of the friction material in contact with the said edge portion, a brake shoe with slotted rim adapted to receive the web member, and a spring engaging the web member and maintaining it in position in the slot.

7. In combination, a slotted brake shoe and a readily removable braking element comprising flexible, somewhat yieldable, friction material and a rigid support integrally united to said material and including a web member engaged in the slot of the brake shoe.

8. In combination, a slotted brake shoe and a readily removable braking element of T-shaped cross section comprising flexible, somewhat yieldable, friction material, a rigid support integrally united thereto, and a web member of said support engaged in the slot of the brake shoe.

GEORGE CHRISTENSON.